Dec. 14, 1954

K. N. ANDERSSON 2,697,190

ELECTRICAL REMOTE TRANSMISSION SYSTEM
FOR TRANSMITTING VARYING MAGNITUDES

Filed Jan. 26, 1951

4 Sheets-Sheet 1

KARL NIAL ANDERSSON Inventor

By [signature]

Attorney

Dec. 14, 1954

K. N. ANDERSSON

ELECTRICAL REMOTE TRANSMISSION SYSTEM FOR TRANSMITTING VARYING MAGNITUDES 2,697,190

Filed Jan. 26, 1951

4 Sheets-Sheet 2

KARL NIAL ANDERSSON Inventor

By Frederick E. Hane

Attorney

KARL NIAL ANDERSSON
Inventor

Attorney

Dec. 14, 1954

K. N. ANDERSSON 2,697,190

ELECTRICAL REMOTE TRANSMISSION SYSTEM FOR TRANSMITTING VARYING MAGNITUDES

Filed Jan. 26, 1951

4 Sheets-Sheet 4

Inventor

KARL NIAL ANDERSSON

By Andrew L. G. Hays

Attorney

United States Patent Office 2,697,190

Patented Dec. 14, 1954

2,697,190

ELECTRICAL REMOTE TRANSMISSION SYSTEM FOR TRANSMITTING VARYING MAGNITUDES

Karl Nial Andersson, Grondal, Sweden, assignor to Aktiebolaget Bofors, Bofors, Sweden, a corporation of Sweden Application January 26, 1951, Serial No. 207,971

Claims priority, application Sweden January 27, 1950

7 Claims. (Cl. 318—28)

The present invention relates to remote transmission systems for transmitting varying measured values or magnitudes from a transmitter to a receiver, particularly to transmission systems of this type employing signals having a repeating wave pattern of preferably the same frequency but having different phase positions relative to a pulsating reference signal, each of said different phase positions corresponding to a measured magnitude.

Remote transmission systems of the general type, above referred to, are useful for various fields of application. A now preferred application is the control of firearms from a remote fire-control station.

There are already known various systems of transmitting varying measured values or magnitudes. However, the systems, as hitherto known, do not possess sufficient reliability and accuracy, at least for application to remote firearm control.

Accordingly, one of the objects of the present invention is to provide a remote transmission system of the general type, above referred to, which is reliable in operation and more accurate than the systems as hitherto known.

A more specific object of the invention is to provide a system which affords an accuracy sufficient for firearm control stations.

Other and further objects, features and advantages of the invention will be pointed out hereinafter and set forth in the appended claims forming part of the application.

In the accompanying drawing several now preferred embodiments of the invention are shown by way of illustration and not by way of limitation.

Figure 1:
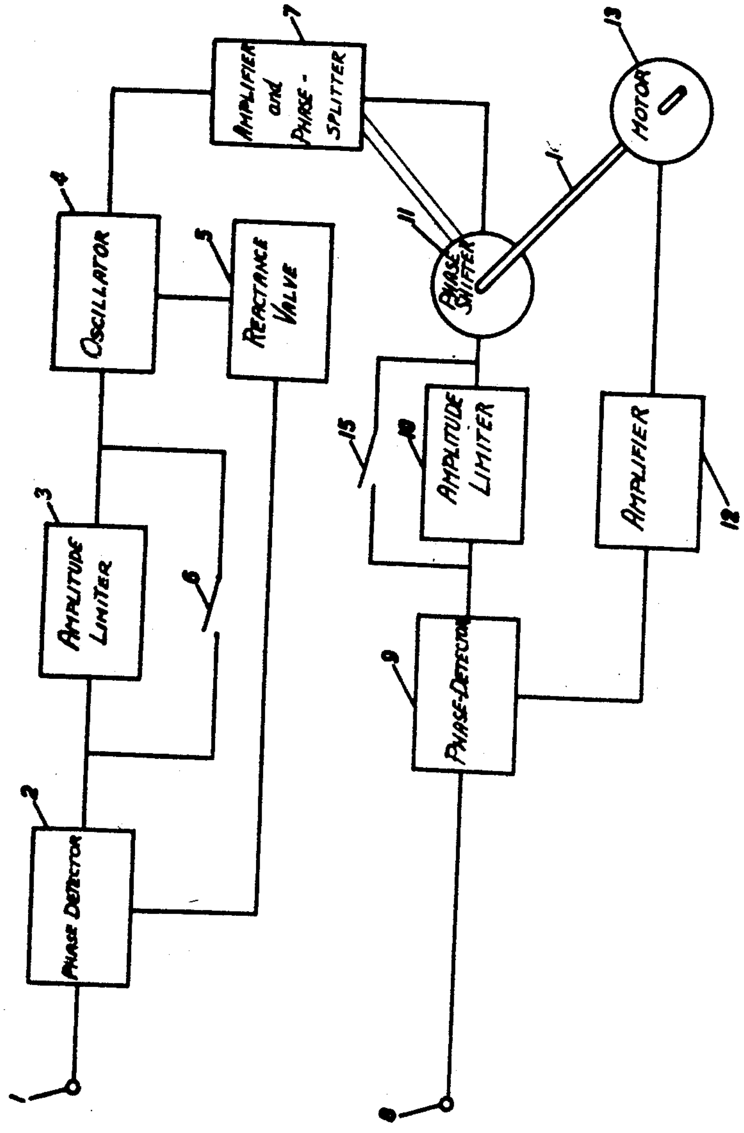
Fig. 1 is a typical circuit diagram of the receiver of a remote transmission system according to the invention.

Referring first to Fig. 1 in detail, the circuit system according to this figure comprises a terminal 1 receiving a reference signal, which is of the same character as the signals which transmit measured magnitudes or values. The signal has a repeating wave pattern and may be sine-shaped, square-shaped, or in the form of short pulses. From the terminal 1, the reference signal is fed to a phase detector 2, the design of which varies with the character of the signal. Different embodiments of the detector will be described later on in detail. Detector 2 is connected to a unit 3 shunted by a switch 6 which is closed when the reference signal is purely sine-shaped. The unit 3 consists of an amplitude limiter for a square-formed reference signal and of a pulse generator for a reference signal of short pulses. With the two last-mentioned signals, the switch 6 is open. Both the switch 6 and the unit 3 are also connected to an oscillator 4. The signal generated in the oscillator 4 is supplied to the phase detector via the said two parallel-connected elements 3 and 6. It will be apparent that when phase detector 2 receives a signal of a certain kind, the unit 3 must generate a signal of the same kind since it would be impossible to compare signals of a different kind in the phase detector, say a pulse-shaped signal with a sine-shaped signal. Unit 3 serves to produce signals identical with those received by phase detector 2. The control signal terminal of the phase detector is connected with the oscillator 4 via reactance valve means 5 for the control of the oscillator. Reactance valve 5 serves as automatic frequency control for the oscillator in the same manner as the reactance valve in a conventional radio receiver. For this purpose, the error signal is supplied to one grid of a two-grid valve and a capacitance means is coupled between the anode or plate of the valve and the other grid. This second grid and the cathode of the valve are then connected to the frequency controlling components of oscillator 4. The oscillator signal is also supplied to an amplifier 7, which includes means for splitting the phase of the signal after amplifying. These means are conveniently arranged in such a manner that two signals are obtained, which are phase shifted $\pi/2$ radians in relation to each other. The two signals are supplied to the stator winding of a rotary phase shifter 11. This winding is arranged in such a way that a rotating magnetic field is obtained. The rotor winding of the phase shifter 11 is connected to a unit 10, which is connected in parallel with a switch 15. Unit 10 is always identical with the unit 3 and the position of the switch 15 is always the same as that of the switch 6. The switch 15 and the unit 10 are also connected to a phase detector 9, which is always identical with the phase detector 2. The control signal terminal of the phase detector 9 is connected to a motor 13 via an amplifier 12. The shaft 14 of the motor 13 is connected with the rotor of the phase shifter 11. Motor 13, when rotating, turns the rotor of the said phase shifter. The phase detector 9 is fed with a value of measurement signal over the terminal 8.

The device, as hereinbefore described, operates as follows:

The reference signal supplied to the phase detector 2 is compared in the detector with the signal coming from the oscillator 4. The detector is designed in such a way that it generates a control or error signal when the two first-mentioned signals differ from a selected phase relation. The said control signal controls, over reactance valve means 5, the oscillator so that the said selected phase relation is restored. The signal of the oscillator 4 is thus synchronized with the reference signal. The oscillator signal is amplified and split in the amplifier 7 in such a manner that the signal when supplied to the phase shifter 11 can create a rotating magnetic field of desired strength in the phase shifter. The output signal of the phase shifter 11 is phase shifted in relation to the oscillator signal by the rotor winding of the shifter being turned. The signal from the rotor is compared in the detector 9 with the value of measurement signal obtained from the terminal 8. The last-mentioned signal has a phase shift in relation to the reference signal that is directly proportional to the measured value or magnitude which is to be transmitted.

In order to ascertain this value, the signal generated in the oscillator 4 and synchronized with the reference signal is phase shifted by the phase shifter in such a way that it obtains a certain predetermined phase relation to the value of measurement signal. After that, the measured value can be read off on an indicator on the phase shifter. The said phase shifting is carried out automatically through a second control or error signal being created in the phase detector 9 at a deviation from the predetermined phase relation. The said control signal, after being amplified, causes rotation of motor 13 in such a manner that the predetermined phase relation is restored.

Figure 2:
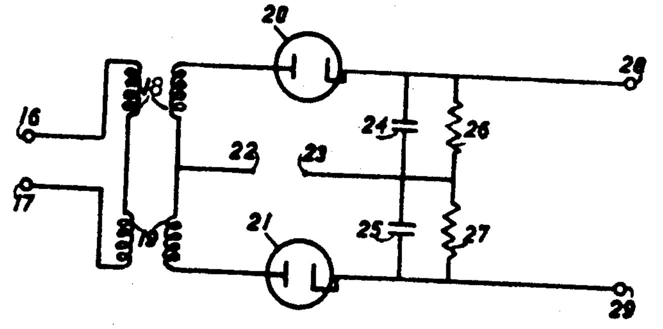
Fig. 2 is a circuit diagram of the phase detecting means forming part of the circuit system according to Fig. 1, the phase detecting means being particularly suitable for sine-shaped signals.
Figure 3:
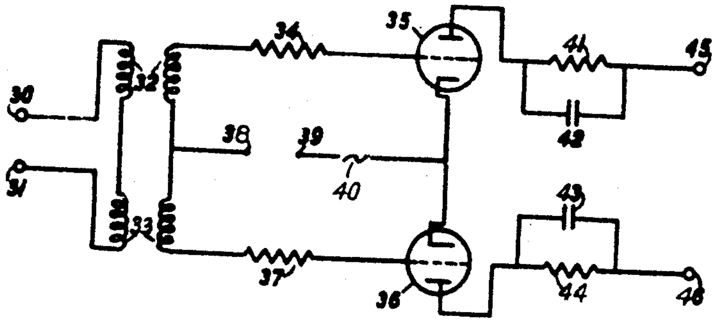
Fig. 3 is a circuit diagram of a phase detecting means forming part of the circuit system according to Fig. 1 and particularly suitable for square-shaped signals.

Fig. 2 shows a typical circuit diagram of a phase detector especially adapted for sine-formed signals. As the figure clearly illustrates the connections of the elements, it suffices to state that the reference numbers 16, 17, 22, 23, 28 and 29 indicate terminals; that the numbers 24 and 25 indicate capacitors; that the numbers 26 and 27 indicate resistors; that the numbers 18 and 19 indicate transformers; and that the numbers 20 and 21 indicate rectifier tubes. The value of measurement signal and the reference signal are supplied to the terminals 16, 17 and 22, 23, respectively. Fig. 3 shows a typical circuit diagram of a phase detector which is particularly adapted for square-formed values of measurement signals and the reference signal. In this figure numerals 30, 31, 38, 39, 45 and 46 indicate terminals; numerals 32 and 33 indicate transformers; numerals 34 and 37, 41 and 44 indicate resistors; numerals 40 indicates an auxiliary voltage source; numerals 35 and 36 indicate triode tubes; and numerals 42 and 43 indicate capacitors. In this circuit diagram, the reference signal and the value of measurement signal are supplied to the terminals 30, 31 and 38, 39, respectively.

Figure 4:
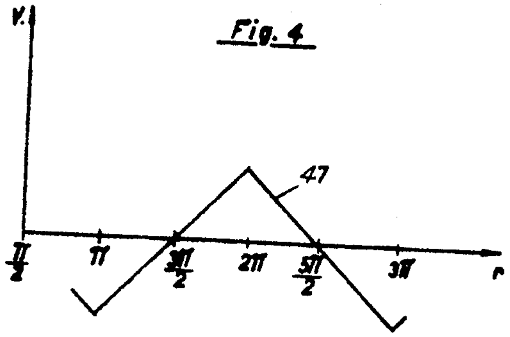
Fig. 4 is a graph illustrating the effects of the phase detecting means according to Figs. 2 and 3.

The nature of the control signal which is obtained as an output signal at the terminals 28, 29 and 45, 46 respectively, and at different phase relations between the value of measurement signal and the reference signal, is illustrated by means of the graph 47 of the Fig. 4. In the said figure, the ordinate shows the voltage of the control signal and the abscissa shows the phase shift between the two first-mentioned signals. The graph indicates that the voltage of the control signal is zero for a phase shift of $5\pi/2$ radians and that the voltage is positive for a phase shift which is somewhat less than $5\pi/2$ radians and that the voltage is negative for a phase shift a little greater than $5\pi/2$ radians. The graph will also obtain the same characteristics at the point $\pi/2$. It has proved convenient to let the detector work around the point $\pi/2$ radians. The control signal will always rotate the motor 13 in such a way that the oscillator signal will be $\pi/2$ radians, phase shifted in relation to the value of measurement signal. The indicator of the phase shifter 11, which indicates the phase difference between the reference signal and the value of measurement signal should be calibrated with regard to the said constant phase shift $\pi/2$ radians.

Figure 5:
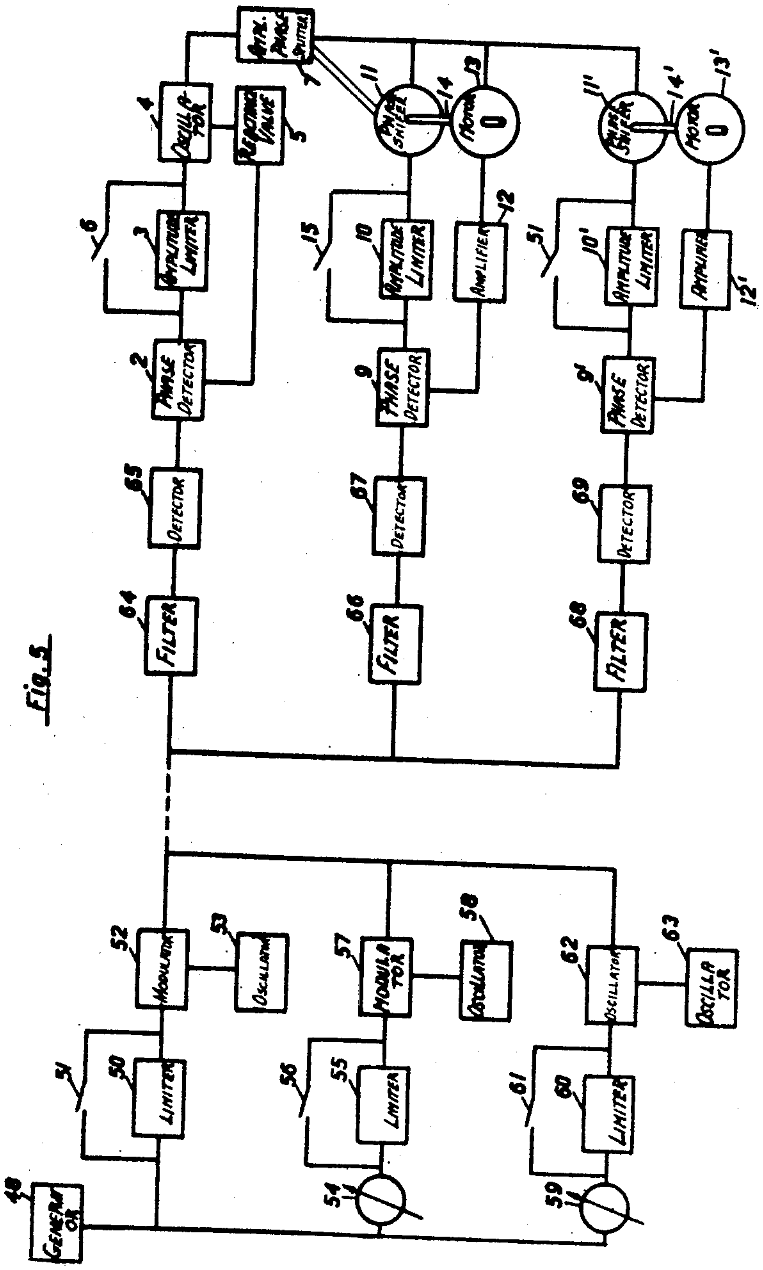
Fig. 5 is a typical circuit system of a remote transmission system according to the invention.

In Fig. 5, a remote transmission system is shown, which serves to transmit two values of measurements. The reference signal and the value of measurement signals may be either sine-shaped or square-shaped.

The elements of the receiver part, which are identical with those of the Fig. 1 have been given either the same reference numbers or the same reference numbers with prime signs.

The system comprises, in the transmitter, a low-frequency generator 48, which supplies a low-frequency signal to the three modulators 52, 57 and 62. The said modulators are also fed with carrier frequency signals of different frequencies from the high-frequency oscillators 53, 58 and 63. The low-frequency signal modulates the carrier-frequency signals in the modulators. The modulated carrier-frequency signals are sent by wire or wireless to the receiver part. The oscillator 48 is connected to the modulator 52 via an amplitude limited 50, which can be short circuited by a switch 51, to the modulator 57 via a phase shifter 54 and an amplitude limiter 55, which can be short-circuited by a switch 56 and to the modulator 62 via a phase shifter 59 and an amplitude limiter 60, which can be short circuited by a switch 61.

When it is desired to work with sine-shaped signals, all three switches are closed. The switches are opened when square-shaped signals are desired.

The values of measurements which are to be transmitted are set on the phase shifters 54 and 59. The modulated signal from the modulator 52, which constitutes the reference signal, is fed to the receiver together with the signals from the modulators 57 and 62, to three band pass filters 64, 66 and 68. The filter 64 lets the signal from the modulator 52 pass, the filter 66 the signal from the modulator 57, and the filter 68 the signal from the modulator 62. Each of the said band-pass filters is connected to a detector 65, 67, and 69, respectively, which each take out a low-frequency signal. The two first-mentioned detectors are connected to the phase detectors 2 and 9. The two detectors are an integral part of a system identical to that of the Fig. 1. The detector 69 is connected to a phase detector 9' which is an integral part of an element group 9' to 15'. The said group is identical with the group 9 to 15. The first-mentioned group is also, as in the case of the group 9 to 15, connected to the amplifier.

In regard to the design and function of elements 9 to 15 and 9' to 15' reference is made to the description of the system of the Fig. 1.

Figure 6:
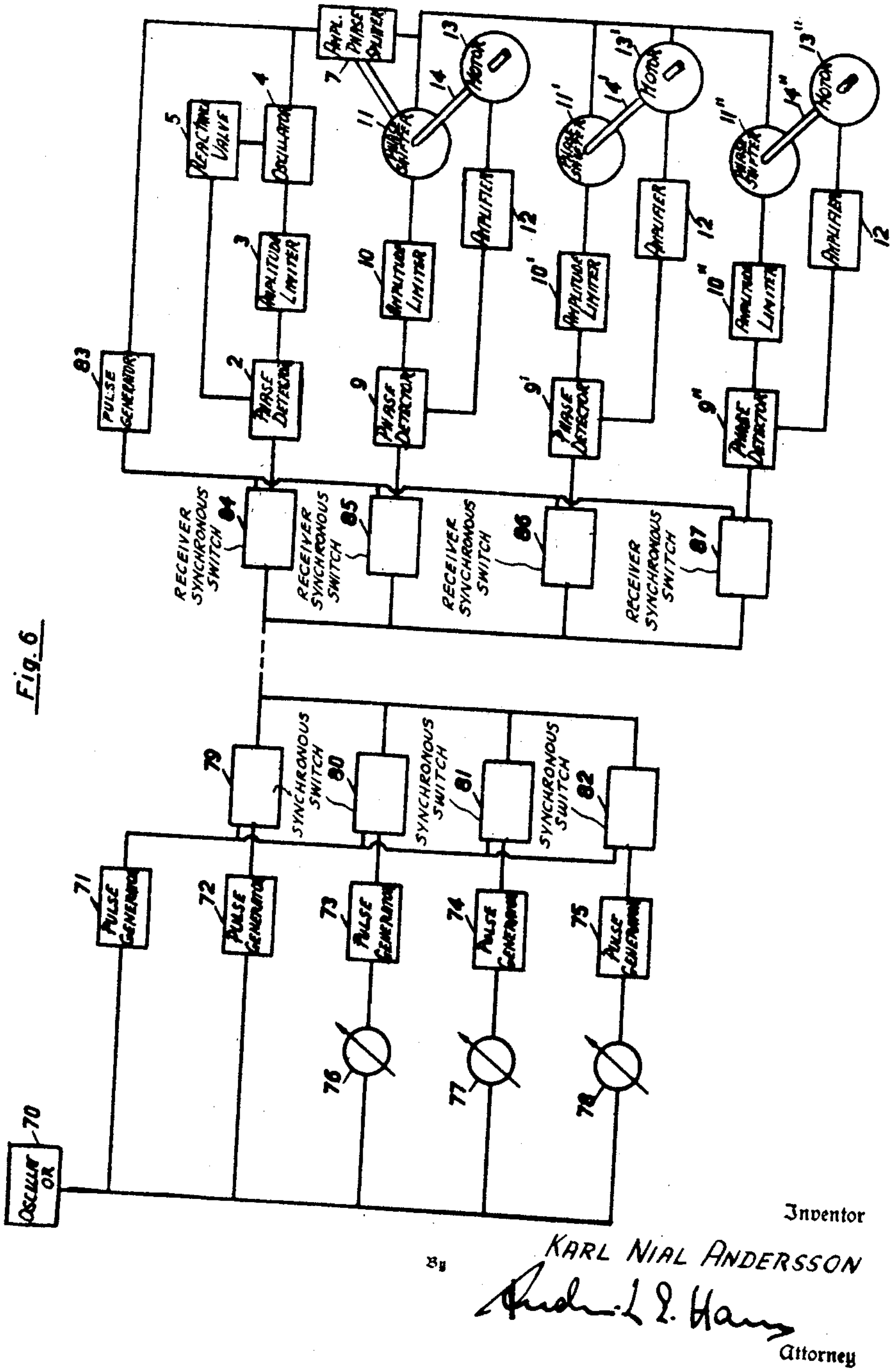
Fig. 6 is a circuit diagram of a modification of a remote transmission system according to the invention.

Fig. 6 shows a remote transmission system for three values of measurements where the transmitted signal are pulse signals.

The elements which are identical with elements of Fig. 1 have either the same reference numbers or the same reference numbers with prime and double prime signs.

In the transmitter of the system, an oscillator 70 is coupled to the pulse generators 71 to 75. Generators 71, 72 are directly connected with the oscillators 70 and the other generators via the phase shifters 76—78. Phase shifters 76, 77, 78 operate in the same manner as in the previously explained system. In all pulse generators, a pulse is generated at the zero point at the beginning and at the end of each period of a signal. The units 79 to 82 form transmitting means that can either be closed or opened for signals and are connected to the pulse generators 72 to 75. The pulse generator 71 is connected to all the synchronous switch units 79 to 82 of the transmitter and controls these units in such a way that during each period, one of the units 79 to 82 is open during the whole of the period while the others are closed. Furthermore, the unit which shall be open during the following period is prepared therefor. The units are moreover arranged so that they are opened successively in the order in which they are mentioned, and that when all have been opened, the first unit is opened anew and then the second, and so on. The pulses of the pulse generator 72 are specially marked and used as reference pulses. The pulses from the transmitter are supplied either by wire or wireless to the synchronous switch units 84 to 87 of the receiver. These receiver units are of the same kind as the transmitter units 79 to 82. The units 84 and 85 are connected to the phase detectors 2 and 9, which are integral parts of a system which is identical with the one shown in the Fig. 1. The units 86 and 87 are connected to the groups of elements 9' to 14' and 9'' to 14'', respectively. The said two groups are each identical to the element group 9 to 14 and connected to the amplifier 7. The units 84 to 87 are controlled by a pulse generator 83 which is connected to the oscillator 4 in the same manner as the units 79 to 82 to the generator 71 but so that the units 79 and 84 are always open at the same time.

It is believed that the operation of the system of Fig. 6 will now be understood if examined in conjunction with the previous description.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. In a remote transmission system for transmitting varying measured magnitudes from a transmitter to a receiver by signals having a repeatingwave pattern and of different phase positions relative to a reference signal having a repeating wave pattern, each of said different phase positions corresponding to a measured magnitude, a receiver comprising oscillating means, phase shifting, means connected to the oscillating means, first signal comparing means connected to the phase shifting means, said comparing means being arranged to compare a signal generated in the oscillating means and fed to the comparing means via the phase shifting means with a signal representing one of said measured magnitudes and to produce an error signal in response to a difference between the phase relation of the two signals and a predetermined phase relation, motor means coupled with said phase shifting means for control of the latter by a rotation of the motor means, circuit means for feeding said error signal to the motor means for actuating the latter so as to adjust the phase shifting means corresponding to said error signal for restoring the phase relation of the said two signals relative to said predetermined phase relation, second signal comparing means, circuit means for feeding said reference signal and the signal generated by the oscillating means to the second comparing means, the said latter means comparing the phase relation of the said reference signal and the signal generated by the oscillating means and producing a second error signal in response to a difference between the said phase relation and a predetermined phase relation, and circuit means feeding the second error signal to the oscillating means so as to restore the phase relation of the two last mentioned signals relative to said predetermined phase relation.

2. A remote transmission system as defined in claim 1, wherein the said circuit means feeding the second error signal to the oscillating means include reactance valve means.

3. A remote transmission system as defined in claim 1, wherein all the aforementioned signals having a repeating wave pattern are sine-shaped.

4. A remote transmission system as defined in claim 1, wherein the said signals representing measured magnitudes and the said reference signal are signals having a short duration relative to the periodicity of the wave pattern of the signals.

5. A remote transmission system as defined in claim 4, in combination with pulse generating means included in the circuit connections between the first signal comparing means and the phase shifting means, and with pulse generating means included in the circuit connections between the second signal comparing means and the oscillating means.

6. A remote transmission system as defined in claim 1, wherein the said signals representing a measured magnitude and the reference signal are square-shaped.

7. A remote transmission system as defined in claim 6, in combination with amplitude limiting means included in the circuit connections between the first signal comparing means and the phase shifting means, and amplitude limiting means included in the circuit connections between the second signal comparing means and the oscillating means.

References Cited in the file of this patent

UNITED STATES PATENTS

| Number | Name | Date |
|---|---|---|
| 2,047,984 | Riggs | July 21, 1936 |
| 2,183,725 | Seeley | Dec. 19, 1939 |
| 2,256,482 | Isbister et al. | Sept. 23, 1941 |
| 2,256,487 | Moseley et al. | Sept. 23, 1941 |
| 2,433,195 | Bond | Dec. 23, 1947 |
| 2,529,510 | Manley | Nov. 14, 1950 |
| 2,556,556 | Schmitt et al. | June 12, 1951 |
| 2,557,581 | Triman | June 19, 1951 |
| 2,564,439 | Marrison | Aug. 14, 1951 |
| 2,588,742 | McCallum | Mar. 11, 1952 |